United States Patent Office 2,816,059
Patented Dec. 10, 1957

2,816,059

N - [β - (O - CHLOROPHENYL) - β - (HYDROXY)-ETHYL] ISOPROPYL AMINE, SALTS THEREOF, AND COMPOSITIONS CONTAINING SAME

Jack Mills, Glenns Valley, Ind., assignor to Eli Lilly and Company, Indianapolis, Ind., a corporation of Indiana No Drawing. Application March 7, 1956,
Serial No. 569,962

4 Claims. (Cl. 167—65)

This invention relates to sympathomimetic amines and more particularly to N-[β-(o-chlorophenyl)-β-(hydroxy)-ethyl] isopropyl amine and acid addition salts thereof.

Owing to their physiological activity, compounds which are derivatives of β-phenyl-β-hydroxyethyl amine, such as epinephrine, ephedrine and the like, are designated sympathomimetic amines. Heretofore certain of these compounds have shown useful bronchodilating activity but their therapeutic application was limited by certain adverse side effects such as strong pressor effects and in many cases, by a lack of oral efficacy.

It is an object of this invention to provide orally effective sympathomimetic amine compounds which have excellent bronchodilator activity with little or no effect on blood pressure or heart rate.

In accordance with the above and other objects, I have provided novel compositions of matter consisting of N-[β-(o-chlorophenyl)-β-(hydroxy)-ethyl] isopropyl amine and its pharmaceutically acceptable acid addition salts. My novel compounds have been found to be useful bronchodilator substances having a minimum of side effects when used at effective oral dose levels. In addition, N-[β-(o-chlorophenyl) - β - (hydroxy) - ethyl] isopropyl amine or one of its salts in appropriate dosage form has been found to be useful in certain cases of so-called "epinephrine-resistant" asthma and of lung obstruction, e. g., that caused by bronchiogenic carcinoma, as well as in the relief of some of the symptoms of emphysema.

N-[β-(o-chlorophenyl)-β-(hydroxy) - ethyl] isopropyl amine is prepared according to the following reaction scheme:

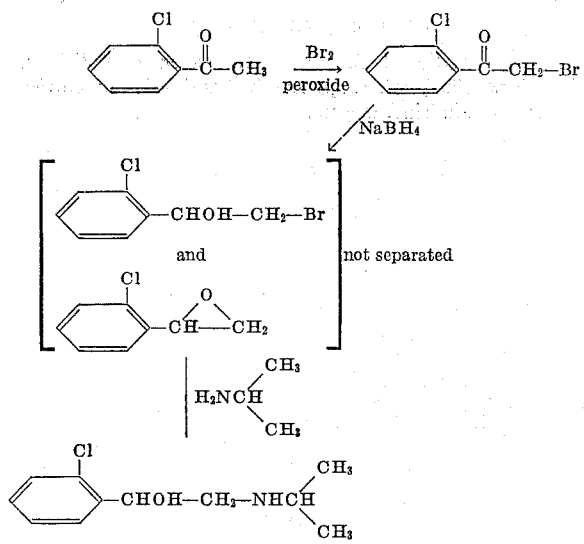

In the course of the above reaction, chloroacetophenone is brominated in the side chain methyl group using liquid bromine and a peroxide catalyst to give β-bromo-o-chloroacetophenone, which is in turn reduced with sodium borohydride to yield a mixture containing o-chlorophenyl ethylene β-bromohydrin and o-chlorophenyl ethylene oxide. The mixture of the last-named compounds is not separated but is treated with excess isopropyl amine whereupon both compounds react to yield N-[β-(o-chlorophenyl)-β-(hydroxy)-ethyl] isopropyl amine. The reaction mixture is made basic and the N-[β-(o-chlorophenyl)-β-(hydroxy)-ethyl] isopropyl amine is isolated by extraction into a water-immiscible solvent. It can then be further purified as the free base. Conveniently, however, N-[β-(o-chlorophenyl)-β - (hydroxy) - ethyl] isopropyl amine is purified in the form of an acid addition salt, and such salts are readily prepared by known methods. Thus, for example, if the acid to be used is a gas, e. g., hydrogen chloride or hydrogen bromide, a small excess over the equivalent amount of the gas is bubbled through a solution of the free base in an inert organic solvent such as benzene, and the acid addition salt is isolated and freed of excess acid by filtration or by evaporation of the solvent. If the selected acid is not gaseous, solutions containing equivalent quantities of the acid and free base in compatible, inert solvents are mixed and the resulting acid addition salt isolated and purified by conventional means.

N-[β-(o-chlorophenyl)-β-(hydroxy) - ethyl] isopropyl amine can be used as a bronchodilating substance in the form of the free base, but it is preferably employed in the form of an acid addition salt with a pharmaceutically acceptable acid, in which form it is readily incorporated into various pharmaceutical compositions. By the term "pharmaceutically acceptable acids" is meant those acids which do not markedly increase the toxicity of the free base when it is used in the form of the particular acid addition salt. Among the pharmaceutically acceptable acids which are useful in preparing acid addition salts with my novel bronchodilator substance, are inorganic acids such as hydrochloric acid, hydrobromic acid, sulfuric acid, nitric acid, phosphoric acid and the like; and organic acids such as tartaric acid, caleic acid, citric acid, benzoic acid, ascorbic acid, lactic acid and the like.

The hydrochloride salt of N-[β-(o-chlorophenyl)-β-(hydroxy)-ethyl] isopropyl amine is preferred for therapeutic use, and an effective dose for oral administration is about 30 mg. If other salts are employed, the amount used should supply the same quantity of the free base as does 30 mg. of the hydrochloride salt. However, the dose can be varied to suit the requirements of treatment, and from 10 to 50 mg. of the base, preferably used in the form of a salt, as described, provide a marked bronchodilating effect, which can relieve asthmatic attacks for periods ranging up to eight hours. The base or the salt which is to be employed therapeutically is dispersed in a pharmaceutical extending medium. The selected dose amount is most conveniently administered in the form of a tablet or pulvule containing the required amount of a solid salt of N-[β-(o-chlorophenyl) - β - (hydroxy) - ethyl] isopropyl amine and a solid extending medium such as lactose, fillers, binders, and the like. The dosage can also be administered by inhalation, as, for example, in the form of an aerosol comprising a solution of the salt in water. Other dosage forms, such as aqueous or oleaginous suspensions, sterile isotonic aqueous solutions for parenteral injection, elixirs, powders and the like can be employed, as is known to the art.

This invention is further illustrated by the following specific example:

*Preparation of N - [β - (o - chlorophenyl)-β-(hydroxy)-ethyl] isopropyl amine and the hydrochloric acid addition salt thereof*

To a solution of 279 g. of o-chloroacetophenone in 2 l. of anhydrous diethyl ether were added about 3 g. of dibenzoyl peroxide. Five grams of bromine were added to the resulting solution, and after three minutes, the color of bromine had been discharged, indicating that the formation of β-bromo-o-chlorophenyl acetophenone had been initiated. A further amount of 288 g. of bromine was added dropwise to the reaction mixture over a one and one-half hour interval. After the addition of the bromine had been completed, the reaction mixture was stirred for one-half hour and poured over about 1 kg. of crushed ice. After the ice had melted, the resulting aqueous and ethereal layers were separated. The ethereal layer containing β-bromo-o-chloroacetophenone was washed with successive 500 ml. quantities of water, 5 percent sodium carbonate solution, and again with water to remove the hydrogen bromide formed as a by-product in the reaction. The ethereal layer was dehydrated by contacting with anhydrous magnesium sulfate. The drying agent was removed by filtration and the ether was evaporated from the filtrate. The residue remaining after the evaporation consisted of about 400 g. of β-bromo-o-chloroacetophenone.

A solution of 400 g. of β-bromo-o-chloroacetophenone in 1 l. of methanol was cooled to about 25° C. A cold solution of 92.5 g. of sodium borohydride in 1 l. of methanol was added as rapidly as possible to this cooled solution while maintaining the temperature below about 25° C. After the addition had been completed, the reaction mixture was allowed to stand for four hours at ambient temperature, to complete the reduction of the keto group of the β-bromo-o-chloroacetophenone. The reaction mixture containing a mixture of o-chlorophenyl ethylene-β-bromohydrin and o-chlorophenyl ethylene oxide was then evaporated in vacuo at room temperature to a syrup which was poured into about 1 l. of 5 percent hydrochloric acid to decompose any borate-alcohol complexes. The two compounds were dissolved in diethyl ether by extracting the acidic layer three times with successive 500 ml. portions of diethyl ether. The combined ether extracts were dried over anhydrous magnesium sulfate and filtered, and the ether was removed by evaporation in vacuo. A residue consisting of 400 g. of a mixture of o-chlorophenyl ethylene-β-bromohydrin and o-chlorophenyl ethylene oxide was obtained.

Four hundred grams of a mixture of o-chlorophenyl ethylene-β-bromohydrin and o-chlorophenyl ethylene oxide were dissolved in 1 l. of anhydrous ethanol. To this solution was added a solution of 306 g. of isopropyl amine in 1 l. of anhydrous ethanol. The reaction mixture was heated at refluxing temperature for about sixteen hours, thus forming N-[β-(o-chlorophenyl)-β-(hydroxy)-ethyl] isopropyl amine. The solvent was removed in vacuo, and to the residue was added a solution containing 200 ml. of 12 N HCl in 2500 ml. of water. The acidic solution was washed twice with 500 ml. portions of ether which were discarded. The acidic layer was then made basic by the addition of 250 ml. of 5 percent (w./v.) sodium hydroxide, thus liberating the free base of N-[β-(o-chlorophenyl)-β-(hydroxy)-ethyl] isopropyl amine. The free base was extracted with two successive 1 l. portions of diethyl ether. The combined ether extracts were dried over anhydrous magnesium sulfate, filtered and concentrated in vacuo to remove all of the solvents. N-[β-(o-chlorophenyl)-β-(hydroxy)-ethyl] isopropyl amine was thus obtained.

The N-[β-(o-chlorophenyl)-β-(hydroxy)-ethyl] isopropyl amine obtained by the foregoing procedure was dissolved in about 3 l. of ether and dry hydrogen chloride gas was bubbled into the solution until it was saturated, whereupon the hydrochloride salt of N-[β-(o-chlorophenyl)-β-(hydroxy)-ethyl] isopropyl amine precipitated. The salt was separated from the ether by filtration, and was dissolved in 2 l. of anhydrous ethanol. The alcoholic solution was decolorized with charcoal and filtered. Three liters of anhydrous ether were added thereto and the N-[β-(o-chlorophenyl)-β-(hydroxy)-ethyl] isopropyl amine hydrochloride precipitated in crystalline form as the monohydrate. The mixture was maintained at about 0° C. for 40 hours and then filtered. The filter cake was washed with ether and dried. About 209 g. of N-[β-(o-chlorophenyl)-β-(hydroxy)-ethyl] isopropyl amine hydrochloride monohydrate, melting at about 163–164° C., were obtained.

*Analysis.*—Calculated for $C_{11}H_{16}ONCl \cdot HCl \cdot H_2O$: Cl, 28.52; N, 5.60. Found: Cl, 28.38; N, 5.42.

I claim:

1. A compound of the group consisting of N-[β-(o-chlorophenyl)-β-(hydroxy)-ethyl] isopropyl amine and pharmaceutically acceptable acid addition salts thereof.

2. N-[β-(o-chlorophenyl)-β-(hydroxy)-ethyl] isopropyl amine.

3. N-[β-(o-chlorophenyl)-β-(hydroxy)-ethyl] isopropyl amine hydrochloride.

4. A bronchodilating composition comprising a therapeutically effective amount of a compound of the group consisting of N-[β-(o-chlorophenyl)-β-(hydroxy)-ethyl] isopropyl amine, and pharmaceutically acceptable acid addition salts thereof, dispersed in a pharmaceutical extending medium.

References Cited in the file of this patent

UNITED STATES PATENTS 2,715,141    Delmar et al. _____ Aug. 9, 1955

OTHER REFERENCES

Burger: Medicinal Chemistry, Interscience Publishers, New York, 1951, vol. 1, pp. 296, 297 and 303, esp. entries referring to aludrine, Isuprel.